United States Patent [19]
Hibino et al.

[11] Patent Number: 5,172,020
[45] Date of Patent: Dec. 15, 1992

[54] MAGNETIC CORE FOR AC ELECTRICAL EQUIPMENTS

[75] Inventors: Sadayoshi Hibino, Suzuka; Motoyasu Mochizuki, Aichi; Tadayuki Sato, Mie, all of Japan

[73] Assignee: Kabushiki Kaisha Toshiba, Kanagawa, Japan

[21] Appl. No.: 629,227

[22] Filed: Dec. 18, 1990

[51] Int. Cl.[5] .......................................... H01L 41/12
[52] U.S. Cl. ..................... 310/26; 310/51; 310/216; 310/254; 310/261; 318/118; 335/215; 336/112
[58] Field of Search .............. 310/26, 216, 217, 261, 310/254, 257, 51, 112, 114; 336/212, 20; 335/115; 318/118

[56] References Cited

U.S. PATENT DOCUMENTS

| | | | |
|---|---|---|---|
| 2,551,848 | 5/1951 | Parker | 310/26 |
| 2,572,313 | 10/1951 | Burns, Jr. | 318/118 |
| 3,007,063 | 10/1961 | Harris | 310/26 |
| 3,696,259 | 10/1983 | Mori | 310/26 |
| 4,377,762 | 3/1983 | Tatsumi | 310/259 |
| 4,427,462 | 1/1984 | Senno | 310/216 |

FOREIGN PATENT DOCUMENTS

| | | | |
|---|---|---|---|
| 0136108 | 11/1976 | Japan. | |
| 0778392 | 7/1957 | United Kingdom | 310/26 |

OTHER PUBLICATIONS

"Development of Fe 6.5 wt % Si Sheet in Commercial Scale Production", Y. Takada et al.; (no month) 1989; Materials Res. Soc., vol. II, pp. 199–207, Kawasaki, Japan.

*Primary Examiner*—R. Skudy
*Attorney, Agent, or Firm*—Philip M. Shaw, Jr.

[57] ABSTRACT

A magnetic core employed in AC motors, transformers and the like includes a first core portion formed by laminating silicon steel sheets each containing 3.5% silicon, the first core portion having two ends in the direction that the sheets are laminated, and second core portions disposed at the respective ends of the first core portion and formed by laminating silicon steel sheets each containing 6.5% silicon. In distorted wave alternating field, low frequency fluxes pass through the first core portion and harmonic fluxes pass through the second core portions. Since each second core portion has a low level of magnetostriction, the magnetic noise due to the harmonics is reduced.

7 Claims, 4 Drawing Sheets

MAGNETIC CORE FOR AC ELECTRICAL EQUIPMENTS

BACKGROUND OF THE INVENTION

This invention relates to a magnetic core used in AC electrical equipments such as electric motors, transformers and reactors which are supplied with an output voltage from an inverter as an AC power supply producing a non-sinusoidal wave voltage.

Conventionally, a magnetic core used in AC electrical equipments has been formed by laminating silicon steel sheets into a laminated core or by combining steel sheets having lower ratio of content of carbon with silicon steel sheets into a laminated core. Japanese Laid-open Patent Application (Kokai) No. 51-136108 discloses such a laminated core as described above.

Inverters have recently been employed as high frequency power supplies to run various electrical equipments. Particularly, when a PWM inverter is employed as such a high frequency power supply, an output voltage contains a large amount of harmonics as well as a fundamental wave ranging between 3 and 80 Hz. Consequently, magnetic fluxes passing through magnetic cores of an electrical equipment contains a large amount of harmonic fluxes, which cause magnetostriction in the magnetic cores of the electrical equipment. The magnetostriction causes electromagnetic noise and vibration.

In a variable speed drive of an induction motor, power supply voltage and frequency applied to the motor are controlled by an inverter. However, it is well known in the art that in the case of driving the motor energized from the inverter, an amount of electromagnetic noise or vibration is increased as compared with the case where the motor is energized from a commercial AC power supply. A major cause for this is the harmonics contained in the applied voltage. The voltage and current waveforms produced by the inverter are non-sinusoidal and contain a relatively large amount of harmonics as well as the fundamental wave in the variable frequency range of 3 to 80 Hz while those of the commercial AC power supply are sinusoidal. When the motor is driven by the inverter such as described above, the harmonics cause harmonic fluxes around the motor windings. The harmonic fluxes induce magnetostriction in a stator core and a rotor core. Furthermore, since a transformer and a reactor are necessarily connected to a high frequency circuit in the electrical equipment employing the inverter as the power supply, the electromagnetic noise or vibration emanating from the transformer and reactor is also increased. To reduce an amount of such an electromagnetic noise, an inductor has conventionally been provided between the motor and the inverter so that the ratio of the harmonics to the fundamental wave contained in the current flowing into the motor windings is reduced, thereby reducing the electromagnetic noise.

However, since the inductor is provided between the motor and the inverter, not only the harmonics but the fundamental wave are reduced. Consequently, operating characteristics of the motor such as the power factor or starting torque are varied or lowered. Furthermore, since the inductor is separately necessitated, a space for mounting the motor needs to be increased.

SUMMARY OF THE INVENTION

Therefore, an object of the present invention is to provide a magnetic core for AC electrical equipments which can reduce the electromagnetic noise and vibration due to the harmonics when the electrical equipment is supplied with the non-sinusoidal voltage from a power supply and prevent the operating characteristics of the electrical equipment from being lowered and the mounting space thereof from being increased.

The present invention provides a magnetic core for electrical equipments comprising a first core portion formed by laminating a number of magnetic steel sheets, the first core portion having two ends in the direction that the steel sheets are laminated, and second core portions each formed of a low magnetostrictive material, the second core portions being disposed at the respective ends of the first core portion.

As the result of reference review and a confirmatory experiment made by the inventors, the low magnetostrictive material such as 6.5% silicon steel sheet which will hereafter be referred to as "high silicon steel sheet" has an exceedingly high level of magnetic permeability against harmonic fluxes of 1 KHz or more while the conventional silicon steel sheet containing 3.5% silicon which will hereafter be referred to as "low silicon steel sheet" has a low level of magnetic permeability.

In accordance with the present invention, the harmonic fluxes due to the harmonics contained in the non-sinusoidal current flowing into the electrical equipment windings concentrates on the low magnetostrictive materials having a high level of magnetic permeability and disposed at the ends of the laminated core in the direction that the steel sheets are laminated, passing therethrough. Accordingly, even when the inverter output voltage is applied to the electrical equipment windings and consequently, a current containing a large amount of harmonics flows in the windings, the magnetostriction caused by the harmonic fluxes is reduced. On the other hand, since the middle core portion of the laminated magnetic core other than both end portions is formed in accordance with the conventional manner, the main flux due to the fundamental wave of the current passes through the middle core portion and accordingly, the saturation of the middle core portion with the main flux due to the low magnetostrictive material is avoided. Consequently, the operating characteristics of the electrical equipment may be prevented from being lowered. Furthermore, since an external device such as a filter inductor mounted on the electrical equipment is not necessary, the equipment mounting space may be prevented from being increased.

Other objects of the present invention will become obvious upon understanding of the illustrative embodiment about to be described. Various advantages not referred to herein will occur to one skilled in the art upon employment of the invention in practice.

DESCRIPTION OF THE PREFERRED EMBODIMENT

Figure 1:
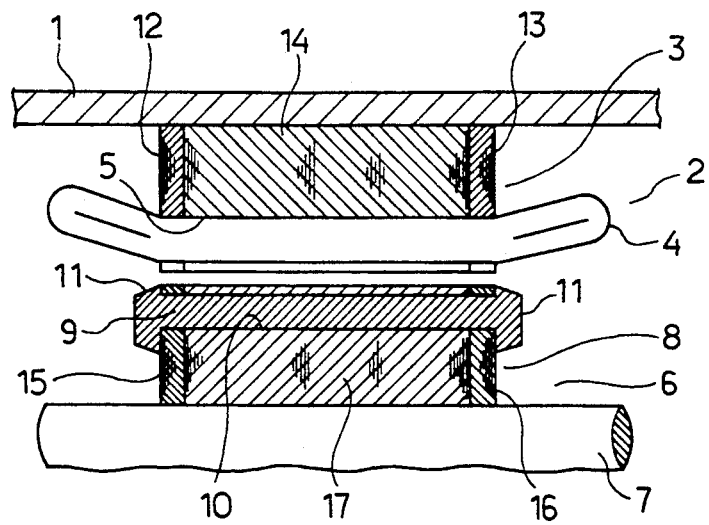
FIG. 1 is a partial sectional view of a stator and rotor of an electric motor showing an embodiment of the present invention.

Two embodiments in each of which the invention is applied to an induction motor will be described with reference to the accompanying drawings Referring to FIG. 1, reference numeral 1 designates a frame of the induction motor in accordance with the present invention. A stator 2 is provided in the frame 1 and comprises a stator core 3 formed into a laminated core and a stator winding 4. A plurality of slots 5 are formed in the inner periphery of the stator core 3 and the stator winding 4 is embedded in the slots 5. A rotor 6 is provided in the stator 2 for rotative movement and comprises a rotor shaft 7, a rotor core 8 formed into a laminated core and squirrel-cage rotor conductors 9 having end rings 11. A plurality of slots 10 are formed in the outer periphery of the rotor core 8 and the rotor conductors 9 are embedded in the slots 10. The end rings 11 are fixed to both ends of the rotor core 8, respectively. The construction described hitherto is identical with that of the conventional induction motor.

Both end portions of the stator core 3 in the direction that the steel sheets are laminated comprise respective low magnetostrictive core portions 12 and 13 each formed by laminating a plurality of high silicon steel sheets each containing 6.5% silicon, in the directions of the axis of the rotor 6. The middle portion of the stator core 3 between the above-described end portions is formed into a conventional laminated core portion 14. The laminated core portion 14 is formed by laminating silicon steel sheets each containing not more than 3.5% silicon, pure steel sheets or cold-rolled steel sheets independently or in combination. On the other hand, both end portions of the rotor core 8 in the direction that the steel sheets are laminated comprise respective low magnetostrictive core portions 15 and 16 formed as in the core portions 12, 13. The middle portion of the rotor core 8 between the end portions is also formed into a conventional laminated core portion 17 as in the core portion 14.

Figure 3:
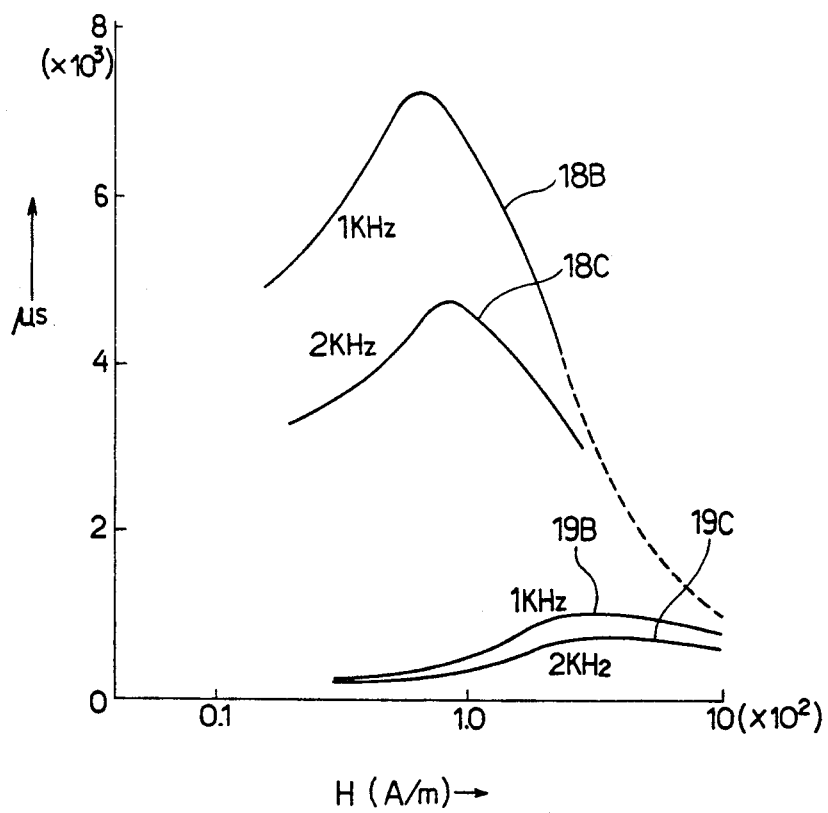
FIG. 3 is a graph showing magnetizing force-relative magnetic permeability characteristics.
Figure 2:
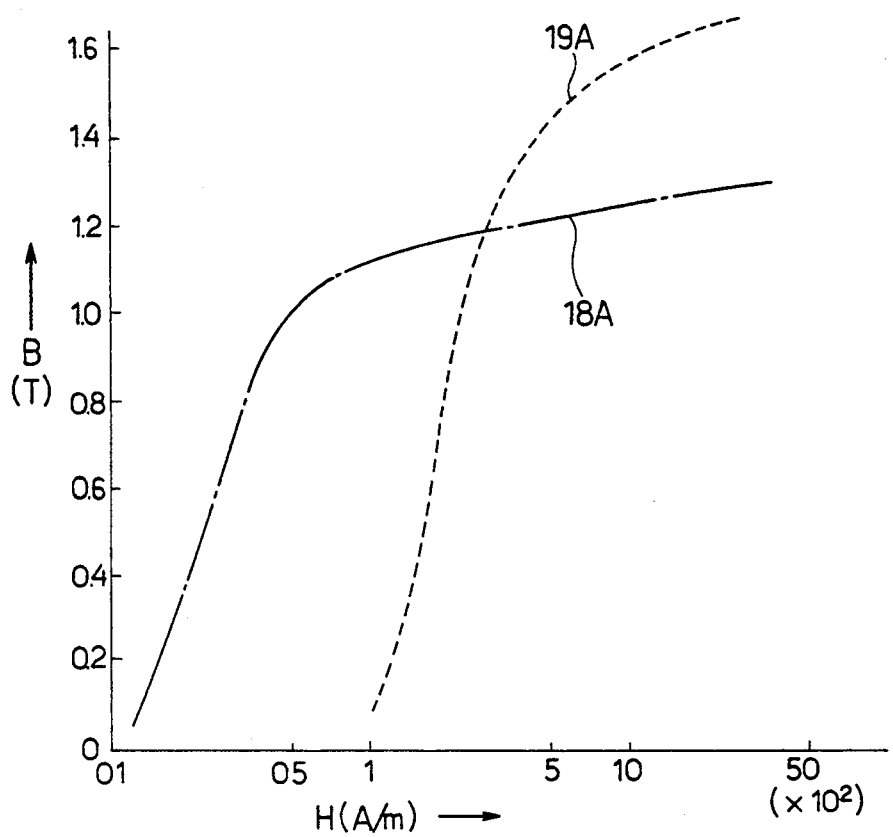
FIG. 2 is a graph showing magnetizing force-magnetic flux density characteristics.

FIGS. 2 and 3 shows the results of an experiment made by the inventors. FIG. 2 shows the relationship between a magnetizing force H in the low frequency range of the fundamental wave and the magnetic flux density B and FIG. 3 shows the relationship between the magnetizing force H and the relative magnetic permeability $\mu$s at the frequencies of 1 KHz and 2 KHz. In each of FIGS. 2 and 3, lines 18A, 18B and 18C represent the characteristics of the silicon steel sheet containing 6.5% silicon and lines 19A, 19B and 19C represent the characteristics of the silicon steel sheet containing 3.5% silicon. The 6.5% silicon steel sheet has a low level of magnetostriction, as is shown in Table 3 or 4 on page 203, Y. Takada et al., "Development of Fe-6.5 wt. % Si sheet in commercial scale production," in Materials Research Society, vol. 11, 1989.

When the above-described induction motor is energized from an inverter, the current flowing into the stator winding 4 contains the low-frequency fundamental wave in the range of 3 to 80 Hz and the high-frequency harmonics at the frequencies of 1 kHz, 2 kHz or above The magnetic flux of the fundamental wave is a main flux and the flux density thereof is 1.3 T or above in the case of most electrical equipments. FIG. 2 shows that the magnetizing force H which the high silicon steel sheet necessitates is $24 \times 10^2$ (A/m) when the flux density is 1.3 T while that which the low silicon steel sheet necessitates is $3.3 \times 10^2$ (A/m). According to this fact, the fundamental wave fluxes pass through the low silicon steel sheet 7.3 times as much as through the high silicon steel sheet and when the magnetic flux density is 1.4 T or above, the fundamental wave fluxes pass through the low silicon steel sheet several ten times as much as through the high silicon steel sheet, which means that almost all of the fundamental wave fluxes pass through the low silicon steel sheet. On the other hand, the number of magnetic fluxes due to the current at the carrier frequency of several kilohertz such as 1 or 2 kHz is represented as the value obtained by multiplying by the number of main magnetic fluxes the ratio obtained by dividing the fundamental wave frequency by the harmonic frequency. For example, when the fundamental wave is at 50 Hz, the number of magnetic fluxes of the harmonic at 1 kHz is one-twentieth that of the fundamental wave and in the same way, the number of magnetic fluxes of the harmonic at 2 kHz is one-fortieth that of the fundamental wave. The magnetizing force H is reduced with decrease in the number of magnetic fluxes of the harmonic.

As obvious from FIG. 3, in the case of the high frequency wave at 1 kHz or above, the relative magnetic permeability of the high silicon steel sheet is higher than that of the low silicon steel sheet. The relative magnetic permeability of the high silicon steel sheet is about twenty times as high as that of the low silicon steel sheet at the frequency of 1 kHz and about ten times as high as that of the low silicon steel sheet at the frequency of 2 kHz. Consequently, since most of the magnetic fluxes containing harmonics pass through the low magnetostrictive core portions 12, 13, 15 and 16 where the magnetostriction is not likely to occur, occurrence of the electromagnetic vibration and noise due to the harmonics contained in the winding current is prevented. In this case, since the harmonic magnetizing force H takes such a small value as below $0.5 \times 10^2$ (A/m), the low magnetostrictive core portions are prevented from being saturated with the harmonic fluxes and accordingly, the harmonic fluxes are prevented from leaking into the conventional laminated core portions 14 and 17. Furthermore, since the fundamental wave fluxes pass through the laminated core portions 14, 17 each comprised of the conventional low silicon steel sheets with a high level of magnetic permeability for the low frequency fluxes, the iron loss is not increased as compared with the prior art.

Figure 4:
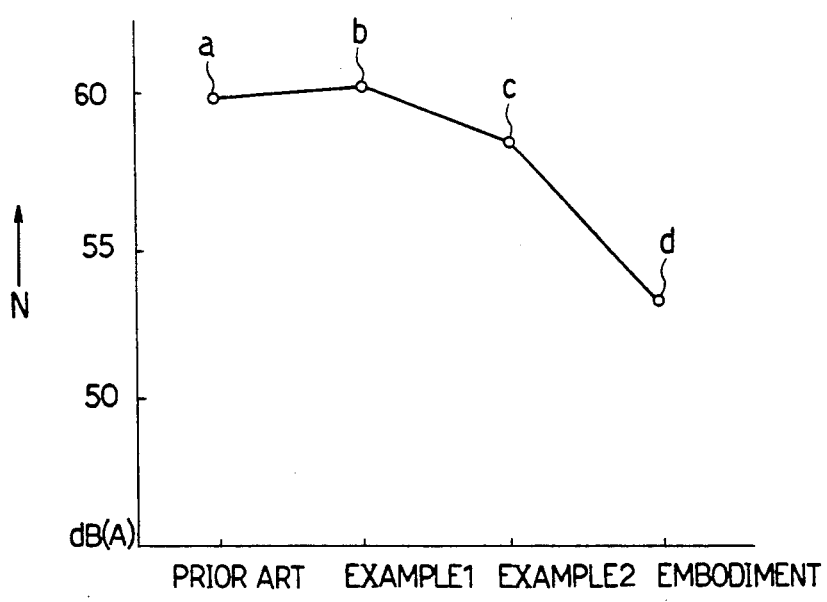
FIG. 4 is a graph showing measured motor noise.
Figure 5:
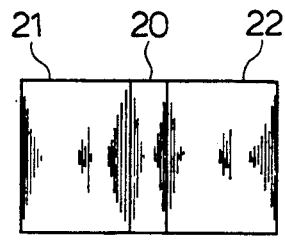
FIG. 5 is a sectional view of a core employed in the motor of an example 1.
Figure 6:
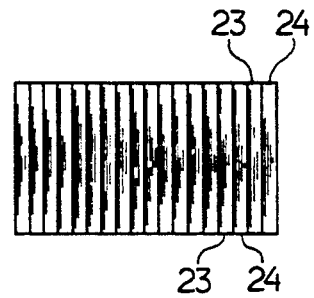
FIG. 6 is also a sectional view of a core employed in the motor of an example 2.

The point b in FIG. 4 denotes the level of noise emanating from the induction motor employing the magnetic cores of the embodiment. The point a denotes the level of noise emanating from a conventional motor wherein the stator and rotor cores are formed into conventional laminated cores. The points c and d indicate the levels of noise emanating from motors of examples 1 and 2, respectively. In the motor of the example 1, as shown in FIG. 5, the middle portions of the stator and rotor cores each comprise a low magnetostrictive core 20 formed by laminating the high silicon steel sheets and the other portions of the stator and rotor cores comprise conventional laminated cores 21 and 22, respectively. Furthermore, in the motor of the example 2, each of the stator and rotor cores is formed by alternately stacking the high and low magnetostrictive silicon steel sheets 23 and 24 as shown in FIG. 6. In each of the examples 1, 2, the low magnetostrictive steel sheet occupies 13% of the whole core in the volume ratio. FIG. 4 obviously shows that the effect of noise reduction in the case of the embodiment is exceedingly high. Particularly, compared with the examples 1 and 2, the arrangement of the embodiment can achieve a higher level of noise reduction because it is considered that the electromagnetic noise unavoidably caused in the middle core portion is prevented from emanating outwardly by the low magnetostrictive core portions 12, 13, 15 and 16.

Figure 7:
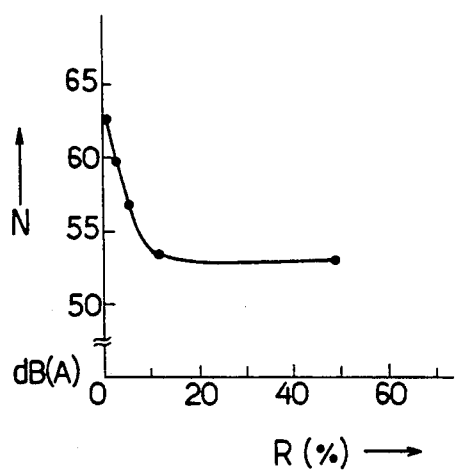
FIG. 7 is a graph showing low magnetostrictive core occupation rate-noise characteristics.

FIG. 7 shows the relationship between the ratio R of the low magnetostrictive core portion to the whole core and the noise N from the core in the construction that the core comprises both end portions formed by laminating the silicon steel plate s each containing 6.5% silicon and the conventionally formed middle core portion between the ends. The effect of noise reduction is raised with increase of the ratio R but the effect is not raised when the ratio R exceeds approximately 13%.

Figure 8:
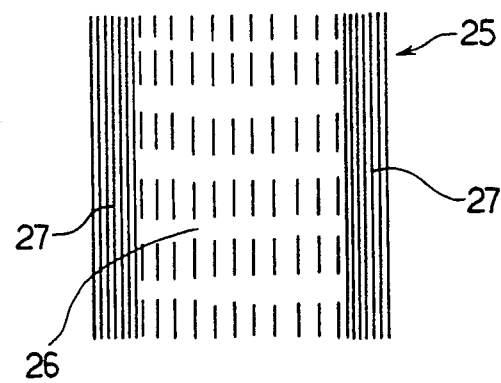
FIG. 8 is a schematic sectional view of the magnetic core of a second embodiment.

FIG. 8 illustrates a second embodiment of the invention. An iron core 25 comprises a middle laminated core portion 26 conventionally formed by laminating low silicon steel sheets and both end low magnetostrictive core portions 27 in the direction of lamination, each portion 27 being formed by laminating the high silicon steel sheets. Each high silicon steel sheet composing both end portions 27 has a thickness smaller than each low silicon steel sheet composing the middle core portion 26.

The iron core 25 is suitable for the condition that the fundamental wave frequency is relatively high and the harmonic frequency is extremely high. When the fundamental wave frequency of the inverter output power is increased to about 400 Hz, the career wave frequency reaches the value of 8 kHz. In such a condition, the fluxes concentrates upon the surfaces of the magnetic sheets because of the surface effect and pass therethrough. In the second embodiment, too, the low magnetostrictive core 27 is formed by laminating the high silicon steel sheets each having a high magnetic permeability at high frequencies. In order that the sectional area of the magnetic path through which the harmonic fluxes pass is substantially increased, each high silicon steel sheet is rendered thin and the number of the laminated sheets is increased. Consequently, the low magnetostrictive core 27 is prevented from being saturated with the harmonic fluxes at the low flux density because of the surface effect, thereby preventing increase in the magnetic resistance. Thus, the occurrence of the magnetic noise and vibration due to relatively higher harmonics are effectively prevented.

Figure 9:
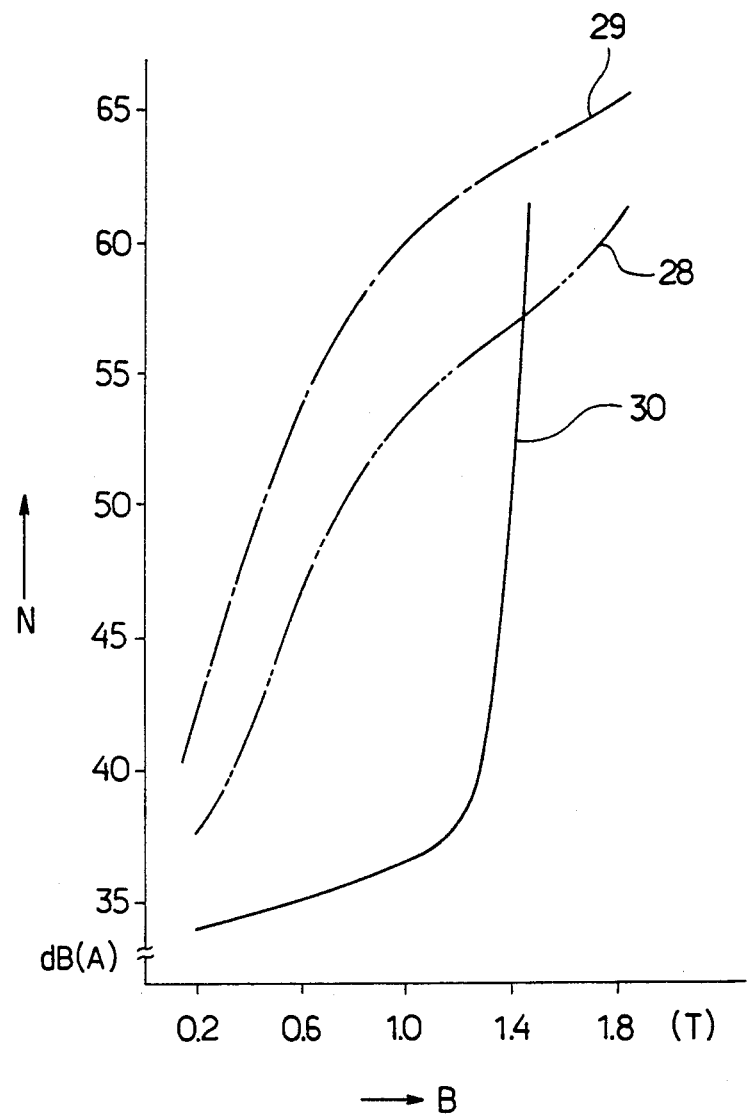
FIG. 9 is a graph showing the noise characteristic of the magnetic core.

FIG. 9 shows the relationship between the flux density B and the noise N obtained from an experiment in which cylindrical laminated cores is used. The inner and outer diameters of the cylindrical laminated core are 60 mm and 80 mm, respectively. An alternate long and two dashes line 28 denotes the characteristic of the laminated core comprising both end low magnetostrictive core portions each formed by laminating eight high silicon steel sheets each having the thickness of 35 mm and a middle core portion formed by laminating thirty-four low silicon steel sheets each having the thickness of 0.5 mm. An alternate long and short dash line 29 denotes the characteristic of the laminated core formed by laminating forty low silicon steel sheets each having the thickness of 0.5 mm in its whole. A solid line 30 denotes the characteristic of the laminated core formed by laminating fifty-seven high silicon steel sheets each having the thickness of 0.35 mm in its whole.

In accordance with FIG. 9, the noise level in the case of the core (line 28) of the present invention is lower by 5 to 6 dB than that in the case of the core (line 29) formed of only the low silicon steel sheets and considerably lower in the flux density range of 1.4 (T) also see FIG. 2 or above than that in the case of the core (line 30) formed of only the high silicon steel sheets. It is considered that the noise level in the case of the core denoted by the line 30 becomes extremely high in the flux density range of 1.4 T or above because of the magnetic saturation.

Although the silicon steel sheets containing 6.5% silicon are employed as the low magnetostrictive material in the foregoing embodiments, plastic molding containing iron powder may be employed as the low magnetostrictive material. Furthermore, although, in the foregoing embodiments, the invention has been applied to the motor of an inner rotor type that the rotor 6 is rotated in the interior of the stator 2, the invention may be applied to those of an outer rotor type that the rotor is rotated outside the stator.

Although both end core portions of each of the stator and rotor cores 3, 8 are formed of the low magnetostrictive material in the foregoing embodiments, both end core portions of either stator or rotor core may be formed of the low magnetostrictive material. In this case, since the magnetostriction induced at both end core portions of either stator or rotor core is reduced, the noise may be reduced. Additionally, the invention may be applied to the electrical equipments such as transformers and reactors.

The foregoing disclosure and drawings are merely illustrative of the principles of the present invention and are not to be interpreted in a limiting sense. The only limitation is to be determined from the appended claims.

We claim:

1. A magnetic core for electrical equipment, on which magnetic core coils excited by an alternating current containing harmonics are wound, the magnetic core comprising a first core portion formed by laminating a number of magnetic steel sheets in a given direction, the first core portion having two ends in the direction that the steel sheets are laminated, and second core portions each formed of a low magnetostriction material having a level of magnetostriction lower than the first core portion, the second core portions being disposed at each of the ends of the first core portion.

2. A magnetic core for electrical equipment according to claim 1, wherein each magnetic steel sheet forming the first core portion comprises a silicon steel sheet and the low magnetostrictive material is formed by laminating a number of silicon steel sheets each having a ratio of content of silicon higher than each silicon steel sheet forming the first core portion.

3. A magnetic core for electrical equipment according to claim 2, wherein each silicon steel sheet forming the low magnetostrictive material contains approximately 6.5% silicon.

4. A magnetic core for electrical equipment according to claim 2, wherein each silicon steel sheet forming the low magnetostrictive material has a thickness smaller than each one of the silicon steel sheets forming the first core portion.

5. An electric motor comprising a stator core and a rotor core, either one of the cores being formed of a number of magnetic sheets into a laminated core, the laminated core comprising a first core portion having two ends in a direction that the magnetic sheets are laminated, and second core portions each formed of a low magnetostrictive material, the second core portions being disposed at each of the ends of the first core portion.

6. An electric motor according to claim 5, wherein the laminated core is formed by laminating silicon steel sheets and wherein the low magnetostrictive material has a ratio of content of silicon higher than each silicon steel sheet forming the laminated core.

7. An electric motor comprising a stator core and a rotor core each formed by laminating a number of steel sheets into a laminated core, each core comprising a first core portion having two ends in an axial direction of each core, and second core portions formed of a low magnetostrictive material, the second core portions of each core being disposed at each of the ends of the first core portion.

* * * * *